(12) United States Patent
Moje et al.

(10) Patent No.: US 9,073,619 B2
(45) Date of Patent: Jul. 7, 2015

(54) SECURITY DOOR AND SECURITY AREA

(71) Applicant: Airbus Operations GmbH, Hamburg (DE)

(72) Inventors: Sabrina Moje, Hamburg (DE); Matthias Breuer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/065,671

(22) Filed: Oct. 29, 2013

(65) Prior Publication Data

US 2014/0115966 A1    May 1, 2014

Related U.S. Application Data

(60) Provisional application No. 61/720,003, filed on Oct. 30, 2012.

(30) Foreign Application Priority Data

Oct. 30, 2012    (DE) .......................... 10 2012 021 432

(51) Int. Cl.
*B64C 1/14* (2006.01)
*E06B 3/90* (2006.01)
*B64D 45/00* (2006.01)

(52) U.S. Cl.
CPC ............... *B64C 1/1469* (2013.01); *E06B 3/906* (2013.01); *B64D 45/0015* (2013.01)

(58) Field of Classification Search
CPC ......... E06B 3/903; E06B 3/906; E05D 15/02; B64C 1/1469; B64D 45/0015
USPC ........ 49/45, 41, 40; 109/6–8, 9, 13, 48, 59 R, 109/59 T, 71; 244/118.5, 118.6, 129.4, 244/129.5
See application file for complete search history.

(56) References Cited

U.S. PATENT DOCUMENTS 3,658,277 A  *  4/1972  Anderson .................... 244/1 R
4,928,429 A     5/1990  Colombo
(Continued)

FOREIGN PATENT DOCUMENTS

CN    1697918    11/2005
DE    10204544    8/2003
(Continued)

OTHER PUBLICATIONS

Chinese Office Action, Mar. 30, 2015.

*Primary Examiner* — Katherine Mitchell
*Assistant Examiner* — Marcus Menezes
(74) *Attorney, Agent, or Firm* — Greer, Burns & Crain Ltd.

(57) ABSTRACT

A security door comprises a frame structure, having a lateral surface in which a plurality of doorways are constructed. A first doorway has a first width along an inner circumference of the frame structure, and lateral surface portions delimiting the first doorway in a first direction and a second direction, opposing the first direction, along the inner circumference of the frame structure have a second width. A lock element is received in the frame structure and comprises a first segment, movable along the frame structure inner circumference relative to the frame structure, and a second segment, movable independently of the first segment along the inner circumference relative to the frame structure. The first segment is dimensioned so that, in a position in which it closes the first doorway, it also closes a second doorway adjacent to the first doorway in the first direction along the frame structure inner circumference.

16 Claims, 12 Drawing Sheets

(56) References Cited

U.S. PATENT DOCUMENTS

| | | | |
|---|---|---|---|
| 5,542,211 A * | 8/1996 | Colombo | 49/42 |
| 5,605,014 A * | 2/1997 | Kimura | 49/40 |
| 6,375,562 B1 * | 4/2002 | Hein | 454/188 |
| 6,543,185 B1 * | 4/2003 | Borelli | 49/42 |
| 6,601,797 B2 * | 8/2003 | Sheremeta | 244/118.5 |
| 6,925,756 B2 * | 8/2005 | Roessner et al. | 49/42 |
| 7,249,737 B2 * | 7/2007 | Simmons et al. | 244/129.5 |
| 7,401,438 B2 * | 7/2008 | Wild | 49/42 |
| 2003/0182864 A1 * | 10/2003 | Yokotachi | 49/40 |
| 2005/0241234 A1 | 11/2005 | Ginzel | |
| 2006/0032977 A1 | 2/2006 | Simmons et al. | |
| 2013/0292513 A1 * | 11/2013 | Guering | 244/118.5 |

FOREIGN PATENT DOCUMENTS

| | | |
|---|---|---|
| DE | 102005032168 | 1/2007 |
| EP | 0305340 | 3/1989 |
| EP | 0305340 B1 * | 2/1992 |
| WO | 2005119603 | 12/2005 |

* cited by examiner

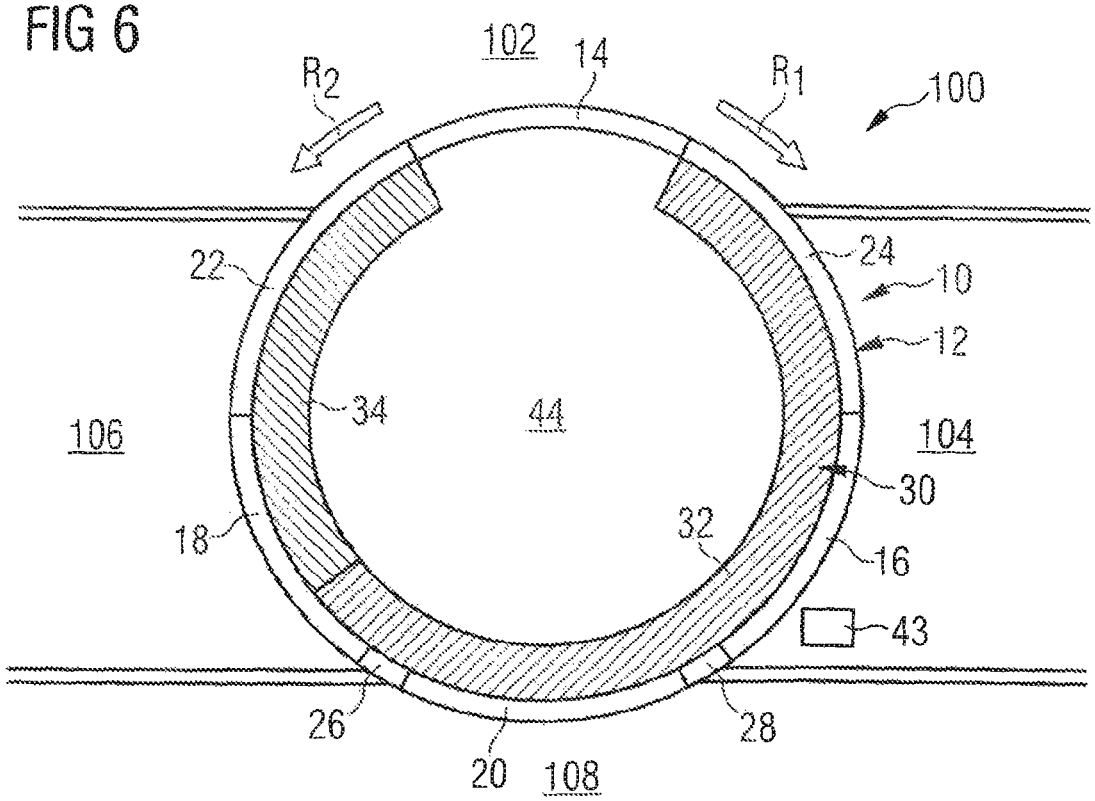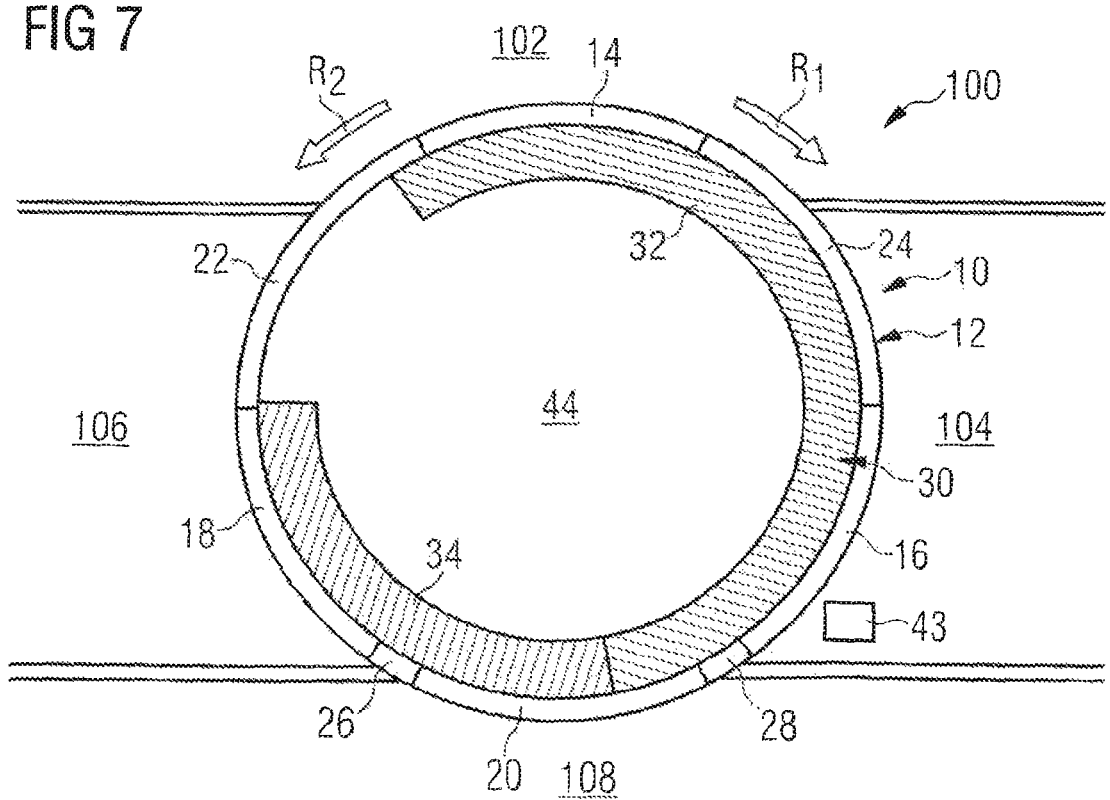

SECURITY DOOR AND SECURITY AREA

CROSS-REFERENCES TO RELATED APPLICATIONS

This application claims the benefit of the U.S. Provisional Application No. 61/720,003, filed on Oct. 30, 2012, and of the German patent application No. 10 2012 021 432.4 filed on Oct. 30, 2012, the entire disclosures of which are incorporated herein by way of reference.

BACKGROUND OF THE INVENTION

The invention relates to a security door, which is particularly suitable for use in a vehicle. The invention further relates to a security area equipped with a security door of this type, in particular a security area of a vehicle, which is equipped with a security door of this type.

The cockpit area on board modern commercial aircraft is subject to particular security regulations. It is particularly necessary to prevent unauthorized persons from gaining entry to the cockpit. A lock system for controlling access to a cockpit is known from DE 102 04 544 B4 or U.S. Pat. No. 6,925,756 B2. This lock system comprises a substantially hollow-cylindrically shaped frame structure in the lateral surface of which a plurality of doorways are constructed. A likewise substantially hollow cylindrical bell-shaped lock is rotatably received in the frame structure. Likewise constructed in a lateral surface of the bell-shaped lock is a doorway which, through a corresponding rotation of the bell-shaped lock relative to the frame structure, can be moved so that it is congruent with one of the doorways constructed in the frame-structure opening to enable entry into an internal area of the lock system, which is delimited by the bell-shaped lock, or to enable exit from the internal area of the lock system, which is delimited by the bell-shaped lock.

SUMMARY OF THE INVENTION

The invention is based on the object of providing a security door which is optimized in terms of its installation space and which enables effective access control for areas adjoining the security door. The invention is furthermore based on the object of providing a security area equipped with a security door of this type.

A security door according to the invention has a frame structure in the lateral surface of which a plurality of doorways are constructed. The frame structure can have, for example, a substantially hollow cylindrical basic shape. A first doorway constructed in the lateral surface of the frame structure has a first width along an inner circumference of the frame structure. If the security door is to be used on board an aircraft, for example in the area of a cockpit, the first width of the first doorway can correspond for example to a required minimum doorway width in an aircraft. The first doorway can serve for example to connect the security door to a cockpit. Lateral surface portions, which delimit the first doorway in a first direction and a second direction, opposed to the first direction, along the inner circumference of the frame structure and are not provided with a doorway, have a second width which can be smaller than, equal to, or greater than the width of the first doorway. It is essentially conceivable to construct the lateral surface portions delimiting the first doorway along the inner circumference of the frame structure with different widths. However, these lateral surface portions preferably have the same width along the inner circumference of the frame structure, with the width of the lateral surface portions corresponding in particular substantially to the first width of the first doorway.

The security door further comprises a lock element received in the frame structure. The lock element comprises a first segment, which is movable along the inner circumference of the frame structure relative to the frame structure, and a second segment which is movable independently of the first segment along the inner circumference of the frame structure relative to the frame structure. Segments which are "movable independently of one another" refer here to segments which, as required, can be moved together or relative to one another in the same direction or in opposite directions along the inner circumference of the frame structure. The first and the second segment of the lock element are preferably dimensioned so that, in a position in which they open a doorway constructed in the lateral surface of the frame structure, they close all other doorways constructed in the lateral surface of the frame structure. This can be achieved for example by a design of the segments of the lock element in which, in a position in which they open a doorway constructed in the lateral surface of the frame structure, the segments extend along the entire remainder of the inner circumference of the frame structure.

The first segment of the lock element is dimensioned so that, in a position in which it closes the first doorway, it also closes a second doorway which is adjacent to the first doorway in the first direction along the inner circumference of the frame structure. The second doorway can serve for example to grant a person situated in the double-door area of the security door access to a service area, for example a washroom or toilet. As a result of the inventive design of the lock element, it can be ensured that a maximum of one doorway is opened when the movement of the segments of the lock element relative to the frame structure is controlled accordingly. In particular, it is possible to prevent the segments of the lock element from arriving in a position in which they partially or completely open the first and the second doorway at the same time. A person entering a lock area, which is delimited by the frame structure and the segments of the lock element, through a doorway then only gains access to one of the areas connected to the security door after entering the lock area. This enables effective access control for the areas adjoining the security door. At the same time, the inventive design of the lock element enables the installation space of the security door to be optimized since, even with small diameters of the lock area, it is possible to realize an adequate doorway width without encountering the problem of two mutually adjacent doorways being partially or completely opened at the same time.

In a preferred embodiment of the security door according to the invention, the second segment of the lock element is dimensioned so that, in a position in which the second segment in the second direction along the inner circumference of the frame structure is immediately adjacent to the first segment closing the first doorway, it is able to close a third doorway adjacent to the first doorway in the second direction along the inner circumference of the frame structure. The third doorway can serve to grant a person situated in the lock area of the security door access to a further service area, for example a washroom or a toilet. If the first segment is positioned relative to the frame structure in such a way that, although the first segment closes the first doorway, it does not extend substantially beyond the first doorway in the second direction along the inner circumference of the frame structure, the second segment then extends along the lateral surface portion delimiting the first doorway in the second direction along the inner circumference of the frame structure and subsequently further over the third doorway.

It is possible to construct a fourth doorway, which is opposite the first doorway, in the lateral surface of the frame structure. If the security door according to the invention is provided for use in a commercial aircraft, a fourth doorway can serve to connect the lock area of the security door to a passenger cabin of the aircraft. A third width of the fourth doorway along the inner circumference of the frame structure preferably corresponds to the first width of the first doorway. Lateral surface portions delimiting the fourth doorway in the first direction and the second direction along the inner circumference of the frame structure can have a fourth width which is smaller than the third width of the fourth doorway. All of the doorways constructed in the lateral surface of the frame structure preferably have a width corresponding to the first width of the first doorway. The fourth width of the lateral surface portions delimiting the fourth doorway along the inner circumference of the frame structure is preferably considerably smaller than the second width of the lateral surface portions delimiting the first doorway along the inner circumference of the frame structure and, in particular, is dimensioned to be small enough for the dimensions of the second segment to be sufficient for closing the fourth and the second or the fourth and the third doorway at the same time when suitably positioned relative to the frame structure.

The security door preferably comprises a control device which is designed to control the movement of the segments of the lock element relative to the frame structure independently of one another according to predefined control regulations for access to areas adjoining the security door. The predefined control regulations can specify for example how the movement of the segments should take place if the fourth doorway is opened first and the second or the third doorway are then to be opened. It may be necessary to control the movement of the segments of the lock element in this way for example if a person is to be granted access to the lock chamber of the security door from a passenger cabin adjoining the fourth doorway and to then be allowed to exit from the lock chamber of the security door through the second or the third doorway into a washroom adjoining the second or the third doorway.

The predefined control regulations can further specify how the movement of the segments should take place if the fourth doorway is opened first and then the first doorway is to be opened. It may be necessary to control the movement of the segments of the lock element in this way for example if a person is to be allowed to enter the lock chamber of the security door from a passenger cabin adjoining the fourth doorway and then to exit from the lock chamber of the security door through the first doorway into a cockpit adjoining the first doorway. It goes without saying that different control regulations can apply for different movements of the segments, for example depending on particular security requirements. The control regulations according to which the control device controls the movement of the segments of the lock element relative to the frame structure can be stored in a memory of the control device.

The control device is preferably designed to control the movement of the segments of the lock element relative to the frame structure in such a way that the segments are moved together, i.e., at the same time and in the same direction, relative to the frame structure from a first position, in which the segments open the fourth doorway, in the second direction along the inner circumference of the frame structure into a second position, in which the segments open the second doorway. Alternatively or in addition to this, the control device can be designed to control the movement of the segments of the lock element relative to the frame structure in such a way that the segments are moved together, i.e., at the same time and in the same direction, relative to the frame structure from a first position, in which the segments open the fourth doorway, in the first direction along the inner circumference of the frame structure into a third position, in which the segments open the third doorway.

The control device can further be designed to control the movement of the segments of the lock element relative to the frame structure in such a way that the segments are moved together, i.e., at the same time and in the same direction, relative to the frame structure from a fourth position, in which the segments open the first doorway, in the first direction along the inner circumference of the frame structure into the second position, in which the segments open the second doorway. Alternatively or in addition to this, the control device can be designed to control the movement of the segments of the lock element relative to the frame structure in such a way that the segments are moved together, i.e., at the same time and in the same direction, relative to the frame structure from a fourth position, in which the segments open the first doorway, in the second direction along the inner circumference of the frame structure into the third position, in which the segments open the third doorway.

When the security door according to the invention is used in an aircraft, the control regulations of the control device can then specify a common movement (i.e., at the same time and in the same direction) of the segments of the lock element relative to the frame structure if a person is to be allowed to enter the lock chamber of the security door from a passenger cabin adjoining the fourth doorway and then to exit the lock chamber of the security door through the second or third doorway into a washroom adjoining the second or third doorway. In similar manner, the control regulations of the control device can specify a common movement (i.e., at the same time and in the same direction) of the segments of the lock element relative to the frame structure if a person is to be allowed to enter the lock chamber of the security door from a cockpit adjoining the first doorway and then to exit the lock chamber of the security door through the second or third doorway into a washroom adjoining the second or third doorway.

The control device can further be designed to control the movement of the segments of the lock element relative to the frame structure in such a way that, starting from the first position, in which the segments open the fourth doorway, the second position, in which segments open the second doorway, and/or the third position, in which the segments open the third doorway, the segments are moved relative to the frame structure along the inner circumference of the frame structure into a fifth position, in which the segments close all of the doorways constructed in the lateral surface of the frame structure. When the security door according to the invention is used in an aircraft, provision can therefore be made to seal off the lock chamber completely after a person has entered the lock chamber from the passenger cabin or a washroom via the second, the third or the fourth doorway.

The control device can further be designed to control the movement of the segments of the lock element relative to the frame structure in such a way that the segments are then moved from the fifth position along the inner circumference of the frame structure into the fourth position, in which the segments open the first doorway. When the security door according to the invention is used in an aircraft, the access to the cockpit can be opened by this movement of the segments. The control device can be designed to control the movement of the segments of the lock element relative to the frame structure starting from the fifth position, in which the segments close all of the doorways constructed in the lateral surface of the frame structure, according to a suitable opening signal. The opening signal can be issued for example as a reaction to inputting an access code.

The control device can be designed for example to control the movement of the segments of the lock element relative to the frame structure in such a way that, starting from the first position, in which the segments open the fourth doorway, the second segment is moved relative to the frame structure and the first segment in the second direction along the inner circumference of the frame structure into the fifth position, in which the segments close all the doorways constructed in the lateral surface of the frame structure. The segments can then be moved together, i.e., at the same time and in the same direction, relative to the frame structure from the fifth position in the first direction along the inner circumference of the frame structure into the fourth position, in which the segments open the first doorway.

In a preferred embodiment of the security door, the first segment of the lock element comprises a first segment portion, which can be moved along the inner circumference of the frame structure relative to the frame structure, and a second segment portion which can be moved independently of the first segment portion along the inner circumference of the frame structure relative to the frame structure. Segment portions which are "movable independently of one another" refer here to segment portions which, as required, can be moved together or relative to one another in the same direction or in opposite directions along the inner circumference of the frame structure. The first segment portion of the first segment is preferably dimensioned so that, when the first segment portion is positioned accordingly relative to the frame structure, it is able to close the first doorway. If all doorways have the same width, when the first segment portion is positioned accordingly relative to the frame structure, the first segment portion of the first segment is preferably able to close each doorway. If the segments of the lock element are located in their first position, in which they open the fourth doorway, the first segment portion of the first segment extends along the inner circumference of the frame structure over the first doorway and adjoins the second segment in the second direction along the inner circumference of the frame structure.

Also in an embodiment of the first segment with two segment portions, the control device is preferably designed to control the movement of the segments of the lock element relative to the frame structure in such a way that the segments and therefore also the segment portions of the first segment are moved together, i.e., at the same time and in the same direction, relative to the frame structure from a first position, in which the segments open the fourth doorway, in the second direction along the inner circumference of the frame structure into a second position, in which the segments open the second doorway. Alternatively or in addition to this, the control device can be designed to control the movement of the segments of the lock element relative to the frame structure in such a way that the segments and therefore also the segment portions of the first segment are moved together, i.e., at the same time and in the same direction, relative to the frame structure from a first position, in which the segments open the fourth doorway, in the first direction along the inner circumference of the frame structure into a third position, in which the segments open the third doorway.

The control device can further be designed to control the movement of the segments of the lock element relative to the frame structure in such a way that the segments and therefore also the segment portions of the first segment are moved together, i.e., at the same time and in the same direction, relative to the frame structure from a fourth position, in which the segments open the first doorway, in the first direction along the inner circumference of the frame structure into the second position, in which the segments open the second doorway. Alternatively or in addition to this, the control device can be designed to control the movement of the segments of the lock element relative to the frame structure in such a way that the segments and therefore also the segment portions of the first segment are moved together, i.e., at the same time and in the same direction, relative to the frame structure from a fourth position, in which the segments open the first doorway, in the second direction along the inner circumference of the frame structure into the third position, in which the segments open the third doorway.

The control device can moreover be designed to control the movement of the segments of the lock element and the segment portions of the first segment relative to the frame structure in such a way that, starting from the first position, in which the segments open the fourth doorway, the segments are moved relative to the frame structure along the inner circumference of the frame structure into a sixth position, in which the segments close all the doorways constructed in the lateral surface of the frame structure. The sixth position, which a first segment comprising two segment portions and a second segment assume in order to close all the doorways constructed in the lateral surface of the frame structure, can differ from the fifth position described above, which a first segment constructed as one piece and a second segment assume in order to close all the doorways constructed in the lateral surface of the frame structure. The control device can further control the movement of the segments in such a way that the segments are then moved from the sixth position along the inner circumference of the frame structure into the fourth position, in which the segments open the first doorway. The fourth position, which a first segment comprising two segment portions and a second segment assume in order to open the first doorway, preferably corresponds to the fourth position described above, which a first segment constructed in one piece and a second segment assume in order to open the first doorway.

The control device can further be designed to control the movement of the first and the second segment of the lock element relative to the frame structure in such a way that, starting from the first position, in which the segments open the fourth doorway, the second segment is moved relative to the frame structure and the first segment portion of the first segment in the second direction along the inner circumference of the frame structure. The control device can further control a movement of the second segment portion of the first segment relative to the frame structure and the first segment portion of the first segment in the first direction along the inner circumference of the frame structure into the sixth position, in which the segments close all the doorways constructed in the lateral surface of the frame structure. In other words, the first segment portion of the first segment remains in its position whilst the second segment portion of the first segment and the second segment move in opposite directions along the inner circumference of the frame structure until all the doorways constructed in the lateral surface of the frame structure are closed.

The control device can further be designed to then initiate a movement of the first segment portion of the first segment relative to the frame structure, the second segment and the second segment portion of the first segment in the second direction along the inner circumference of the frame structure into an intermediate position, in which the first segment portion of the first segment adjoins the second segment. Finally, the control device can be designed to then induce a common movement (i.e., at the same time and in the same direction) of the segments relative to the frame structure from the intermediate position in the second direction along the inner circumference of the frame structure into the fourth position, in which the segments open the first doorway.

The security door can further comprise a swivel arrangement which is designed to enable a swivel movement of the first segment portion of the first segment relative to the frame structure and the second segment portion of the first segment in the direction of an internal area of the frame structure, i.e., in the direction of the lock area of the security door. If the segments of the lock element are located in the first position, in which they open the fourth doorway, the first doorway can be opened at the same time by swiveling the first segment portion of the first segment relative to the frame structure and the second segment portion of the first segment in the direction of the lock area of the security door. It goes without saying that this constellation is not usually desirable in normal operation of the security door. In an emergency, for example in the event of a fire in the area adjoining the first doorway, for example in a cockpit, two fire fighters carrying a extinguishing hose can be granted access to the area adjoining the first doorway.

To counteract misuse of the swivel arrangement, the security door can further comprise a locking mechanism which, in an unlocking position, is designed to permit a swivel movement of the first segment portion of the first segment relative to the frame structure in the direction of the internal area of the frame structure and, in a locking position, to prevent a swivel movement of the first segment portion of the first segment relative to the frame structure in the direction of the internal area of the frame structure. The locking mechanism can be controlled electronically for example, and only assume its unlocking position upon a corresponding signal which indicates for example that the aircraft is on the ground and there is an emergency situation in the cockpit.

Mutually adjacent edge regions of the segments and/or segment portions can preferably be provided with complementary cutouts to enable the edge regions to overlap along the inner circumference of the frame structure. This enables a bulletproof construction of the edge regions.

A security area according to the invention comprises a security door, described above, and a plurality of areas adjoining the security door, which are connected to one another by the security door. The area adjoining the first doorway of the security door can be for example a cockpit of an aircraft. The areas adjoining the second and the third doorway of the security door can be for example service areas, for example washrooms or toilets. The area adjoining the fourth doorway of the security door can be for example a passenger cabin of an aircraft.

BRIEF DESCRIPTION OF THE DRAWINGS

Preferred embodiments of the invention are now explained in more detail with reference to the accompanying schematic drawings, which show.

DETAILED DESCRIPTION OF THE PREFERRED EMBODIMENTS

Figure 1:
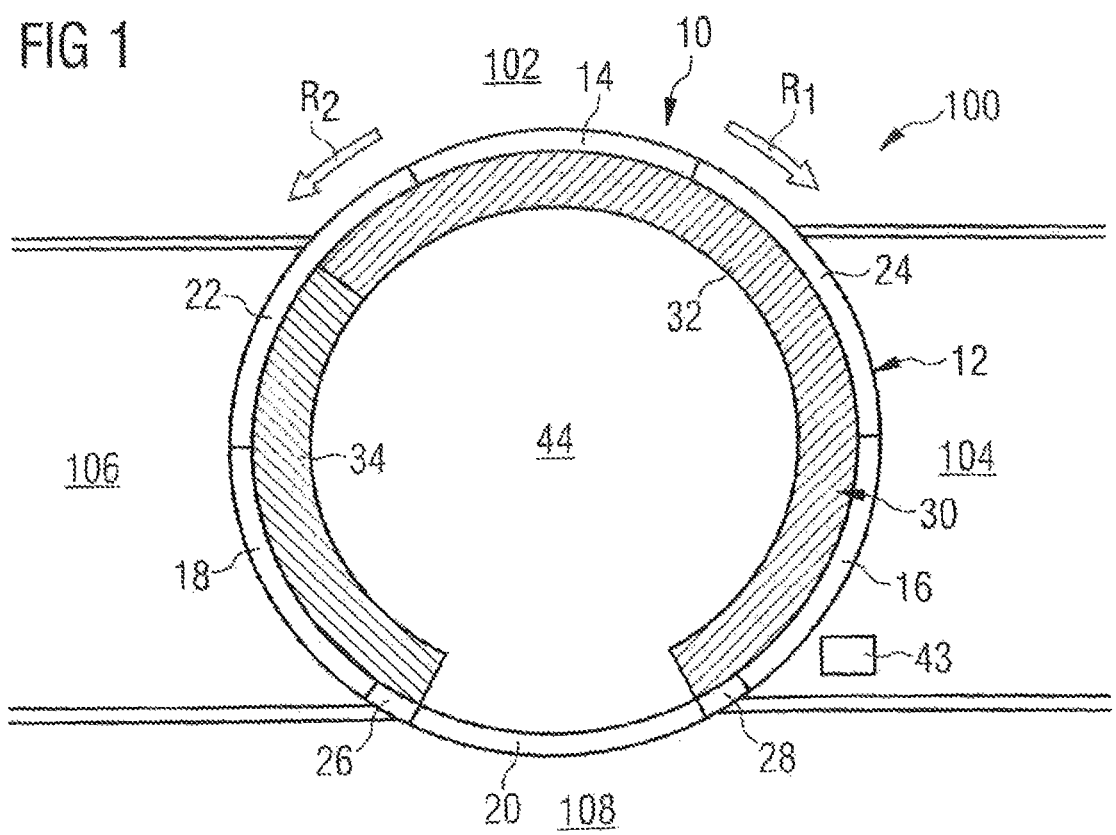
FIG. 1 an aircraft security area equipped with a first embodiment of a security door, wherein segments of a lock element of the security door are located in a first position, FIG. 2 a detailed illustration of the edge region of the segments of the lock element according to FIG. 1, FIG. 3 a frame structure of the security door according to FIG. 1, FIG. 4 the aircraft security area according to FIG. 1, wherein segments of a lock element of the security door are located in a second position, FIG. 5 the aircraft security area according to FIG. 1, wherein segments of a lock element of the security door are located in a third position, FIG. 6 the aircraft security area according to FIG. 1, wherein segments of a lock element of the security door are located in a fourth position, FIG. 7 the aircraft security area according to FIG. 1, wherein segments of a lock element of the security door are located in a fifth position, FIG. 8 an aircraft security area equipped with a second embodiment of a security door, wherein segments of a lock element of the security door are located in a first position, FIG. 9 the aircraft security area according to FIG. 8, wherein segments of a lock element of the security door are located in a second position, FIG. 10 the aircraft security area according to FIG. 8, wherein segments of a lock element of the security door are located in a third position, FIG. 11 the aircraft security area according to FIG. 8, wherein segments of a lock element of the security door are located in a fourth position, FIG. 12 the aircraft security area according to FIG. 8, wherein segments of a lock element of the security door are located in a fifth position, FIG. 13 the aircraft security area according to FIG. 8, wherein segments of a lock element of the security door are located in an intermediate position, and FIG. 14 the aircraft security area according to FIG. 8, wherein a first segment portion of a first segment of the lock element is swiveled relative to the second segment portion of the first segment, a second segment and the frame structure.

A security area 100 of an aircraft is shown in each of FIGS. 1 to 14. The security area 100 comprises a first area 102, constructed in the form of a cockpit, a second area 104, constructed as a washroom or toilet, a third area 106 likewise constructed as a washroom or toilet, and a fourth area 108 formed by a passenger cabin. The four areas 102, 104, 106, 108 are connected to one another by a security door 10.

Figure 3:
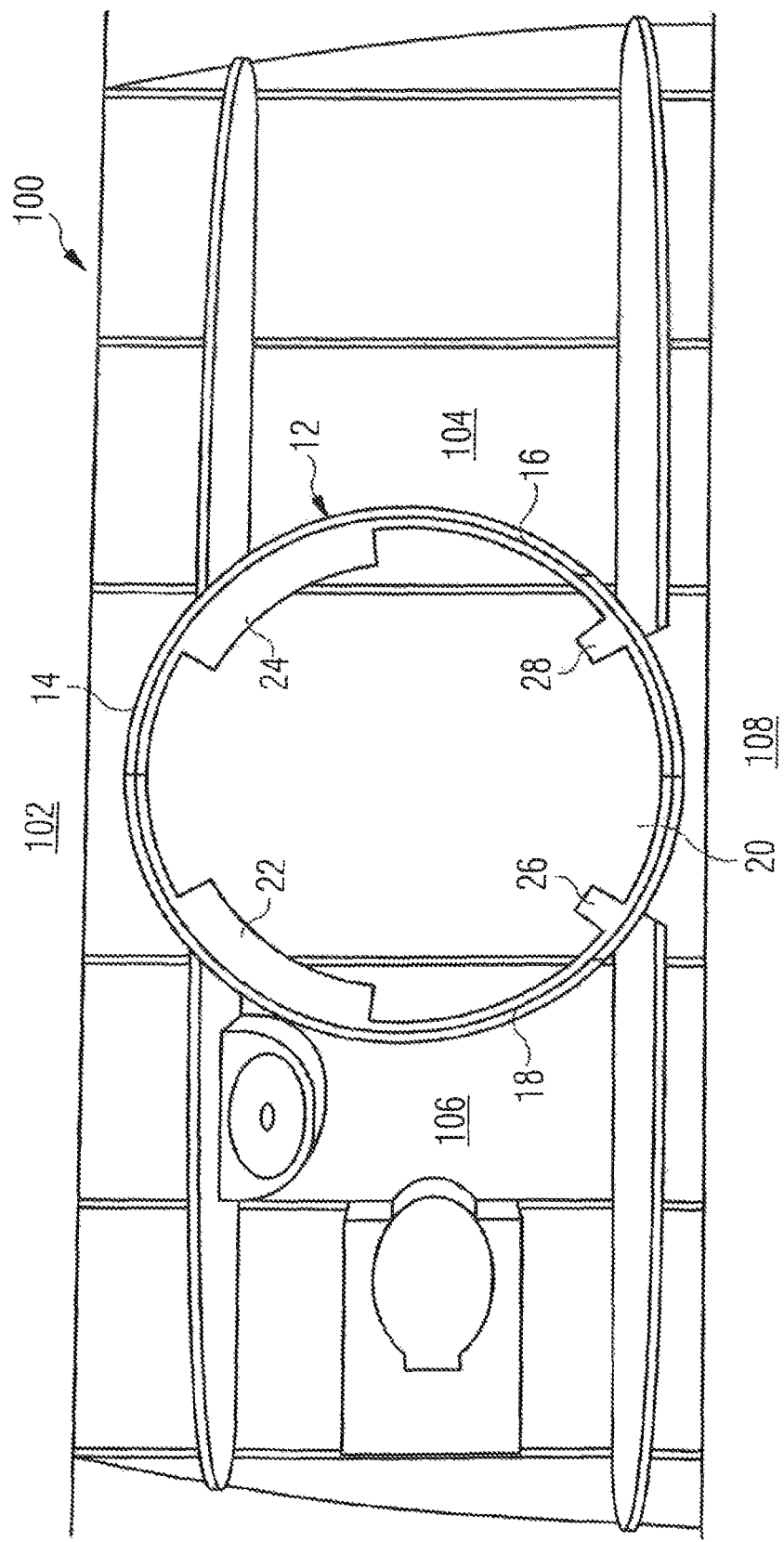

The security door 10 comprises a frame structure 12 with a substantially hollow cylindrical basic shape, in the lateral surface of which a plurality of doorways 14, 16, 18, 20 is constructed, see in particular FIG. 3. A first doorway 14 constructed in the lateral surface of the frame structure 12 serves to connect the security door 10 to the first area 102 constructed in the form of a cockpit. A second doorway 16 constructed in the lateral surface of the frame structure 12 serves to connect the security door 10 to the second area 104 constructed as a washroom or toilet. A third doorway 18 constructed in the lateral surface of the frame structure 12 serves to connect the security door 10 to the third area 106 constructed as a washroom or toilet. Finally, a fourth doorway 20 constructed in the lateral surface of the frame structure 12 serves to connect the security door 10 to the fourth area 108 formed by a passenger cabin. As seen along the inner circumference of the frame structure 12, all the doorways 14, 16, 18, 20 have the same width, which corresponds to a required minimum doorway width in an aircraft.

Lateral surface portions 22, 24, which delimit the first doorway 14 in a first direction R1 and a second direction R2, which is opposed to the first direction R1, along the inner circumference of the frame structure 12 and are not provided with a doorway, have a width which corresponds substantially to the width of the first doorway 14. However, it is also conceivable to select the width of the lateral surface portions 22, 24 so that it is smaller or larger than the width of the first doorway 14. The fourth doorway 20 located opposite the first doorway 14 is delimited in the first direction R1 and the second direction R2 along the inner circumference of the frame structure 12 by lateral surface portions 26, 28, which are not provided with a doorway and whereof the width along the inner circumference of the frame structure 12 is considerably smaller than the width of the doorways 14, 16, 18, 20 and the lateral surface portions 22, 24 delimiting the first doorway 14.

The security door further comprises a lock element 30 received in the frame structure 12. The lock element 30 comprises a first segment 32, which is movable along the inner circumference of the frame structure 12 relative to the frame structure 12, and a second segment 34, which is movable independently of the first segment 32 along the inner circumference of the frame structure relative to the frame structure, see FIGS. 1 and 4 to 7. The first and the second segment 32, 34 of the lock element 30 are dimensioned so that, in a position in which they open any doorway 14, 16, 18, 20 constructed in the lateral surface of the frame structure 12, they close all other doorways 14, 16, 18, 20 constructed in the lateral surface of the frame structure 12. The first segment 32 of the lock element 30 is dimensioned so that, in a first position shown in FIG. 1, in which it closes the first doorway 14, it also closes a second doorway 16 adjacent to the first doorway 14 in the first direction R1 along the inner circumference of the frame structure 12.

The second segment 34 of the lock element 30 is dimensioned so that, in the first position shown in FIG. 1, in which the second segment 34 in the second direction R2 along the inner circumference of the frame structure 12 is immediately adjacent to the first segment 32 closing the first doorway 14, it is able to close the third doorway 18, which is adjacent to the first doorway 14 in the second direction R2 along the inner circumference of the frame structure 12. In the first position shown in FIG. 1, in which the first segment 32 is positioned relative to the frame structure 12 in such a way that, although the first segment 32 closes the first doorway 14, it does not extend substantially beyond the first doorway 14 in the second direction R2 along the inner circumference of the frame structure 12, the second segment 34 then extends along the lateral surface portion 22 delimiting the first doorway 14 in the second direction R2 along the inner circumference of the frame structure 12 and subsequently further over the third doorway 18.

Figure 2:
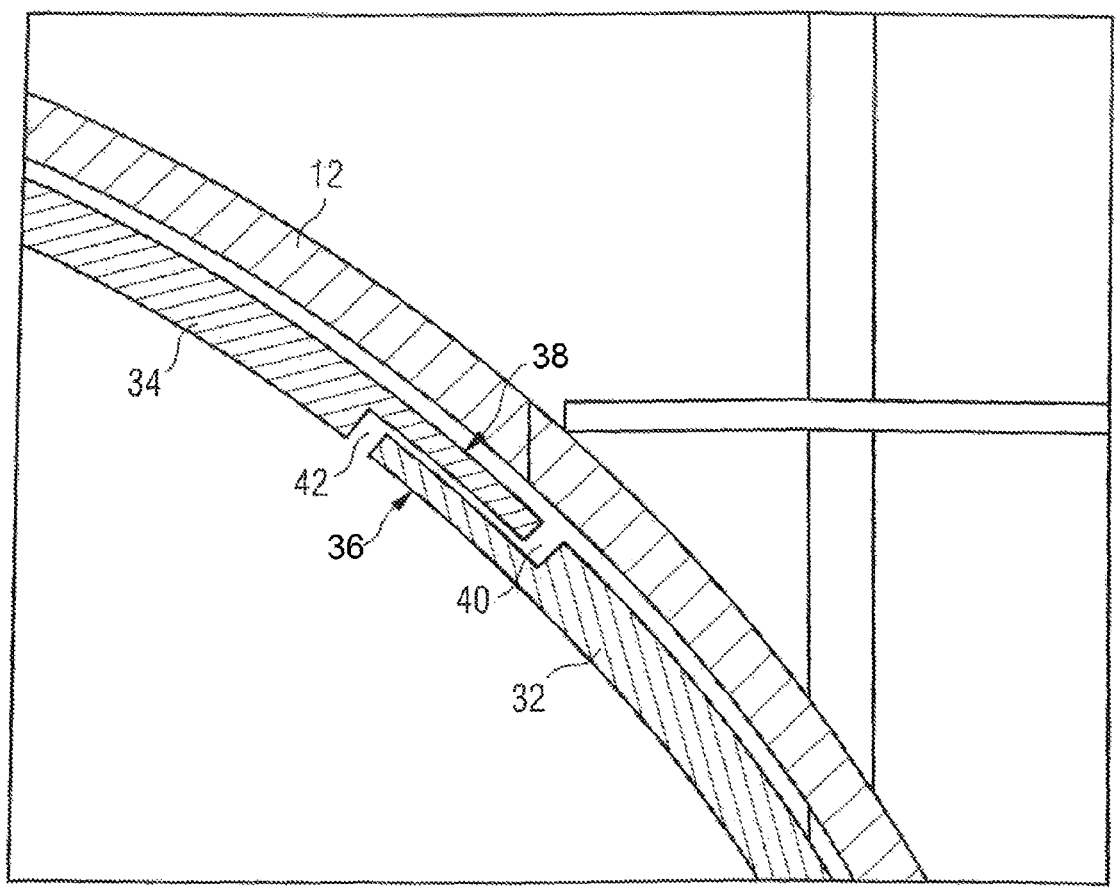

As can be seen in FIG. 2, mutually adjacent edge regions 36, 38 of the segments 30, 32 are provided with complementary cutouts 40, 42 to enable the edge regions 36, 38 to overlap along the inner circumference of the frame structure 12.

The security door further comprises a control device 43 which serves to control the movement of the segments 32, 34 of the lock element 30 relative to the frame structure 12 independently of one another according to predetermined control regulations for access to areas 102, 104, 106, 108 adjoining the security door 10. The predetermined control regulations specify how the movement of the segments 32, 34 has to take place if the fourth doorway 20 is opened first, see FIG. 1, and then the second or third doorway 16, 18 are to be opened, see FIGS. 4 and 5. It is necessary to control the movement of the segments 32, 34 of the lock element 30 in this way if a person is to be allowed to enter a lock chamber 44 of the security door 10 from the area 108, which adjoins the fourth doorway 20 and is constructed in the form of a passenger cabin, and then to exit the lock chamber 44 of the security door 10 through the second or third doorway 16, 18 into the second or third area 104, 106, which adjoins the second or third doorway 16, 18 and is constructed in the form of a washroom.

The predetermined control regulations further specify how the movement of the segments 32, 34 has to take place if the fourth doorway 20 is opened first and then the first doorway 14 is to be opened. It is necessary to control the movement of the segments 32, 34 of the lock element 30 in this way if a person is to be allowed to enter the lock chamber 44 of the security door 10 from the fourth area 108, which adjoins the fourth doorway 20 and is constructed in the form of a passenger cabin, and then to exit the lock chamber 44 of the security door 10 through the first doorway 14 into the first area 102, which adjoins the first doorway and is constructed in the form of a cockpit, see FIGS. 6 and 7. The control regulations are stored in a memory of the control device 43.

Figure 4:
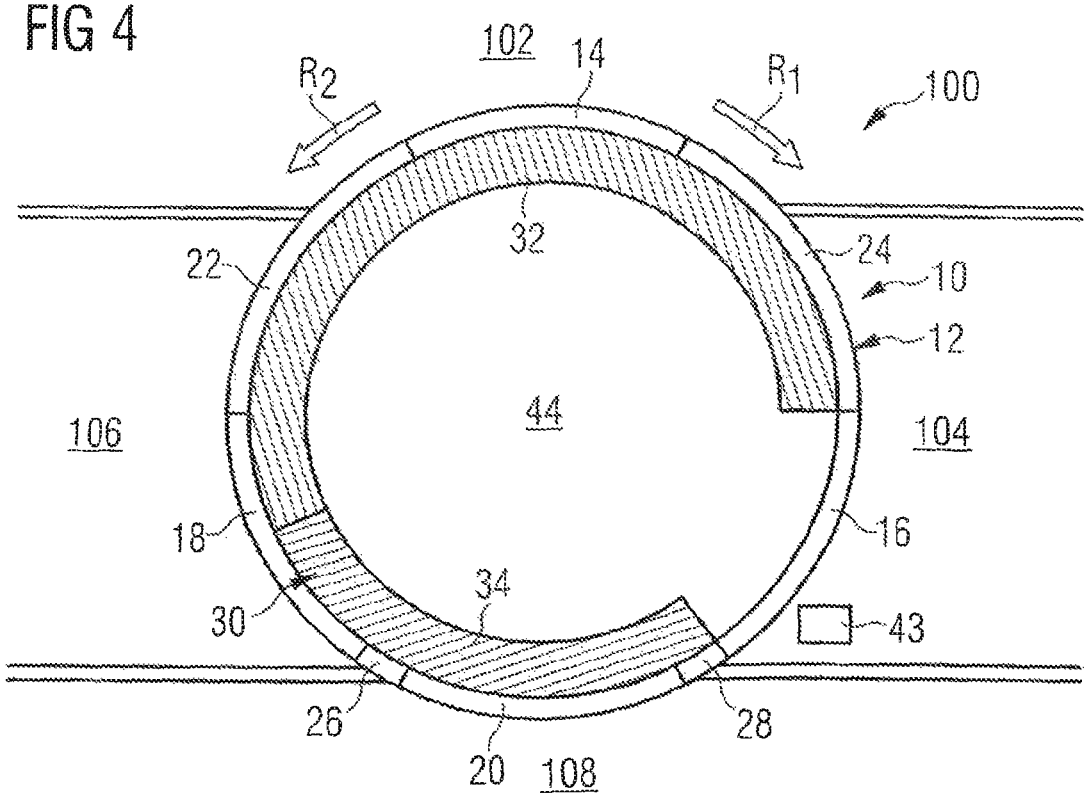

If a person is to be allowed to enter the lock chamber 44 of the security door 10 from the fourth area 108, which adjoins the fourth doorway 20 and is constructed in the form of a passenger cabin, and then to exit the lock chamber 44 of the security door 10 through the second or third doorway 16, 18 into the second or third area 104, 106, which adjoins the second or third doorway 16, 18 and is constructed in the form of a washroom, the control device 43 controls the movement of the segments 32, 34 of the lock element 30 relative to the frame structure 12 in such a way that the segments 32, 34 are moved together relative to the frame structure 12 from the first position shown in FIG. 1, in which the segments 32, 34 open the fourth doorway 20, in the second direction R2 along the inner circumference of the frame structure 12 into a second position shown in FIG. 4, in which the segments 32, 34 open the second doorway 16. The control device 43 further controls the movement of the segments 32, 34 of the lock element 30 relative to the frame structure 12 in such a way that the segments 32, 34 are moved together relative to the frame structure 12 from the first position according to FIG. 1 in the first direction R1 along the inner circumference of the frame structure 12 into a third position shown in FIG. 5, in which the segments 32, 34 open the third doorway 18.

If a person is to be allowed to enter the lock chamber 44 of the security door 10 from the first area 102, which adjoins the first doorway and is constructed in the form of a cockpit, and then to exit the lock chamber 44 of the security door 10 through the second or third doorway 16, 18 into the second or third area 104, 106, which adjoins the second or third doorway 16, 18 and is constructed in the form of a washroom, the control device 43 controls the movement of the segments 32, 34 of the lock element 30 relative to the frame structure 12 in such a way that the segments 32, 34 are moved together relative to the frame structure 12 from a fourth position shown in FIG. 6, in which the segments 32, 34 open the first doorway 14, in the first direction R1 along the inner circumference of the frame structure 12 into the second position (see FIG. 4), in which the segments 32, 34 open the second doorway 16. Alternatively to this, the control device 43 can control the movement of the segments 32, 34 of the lock element 30 relative to the frame structure 12 in such a way that the segments 32, 34 are moved together relative to the frame structure 12 from the fourth position according to FIG. 6, in which the segments 32, 34 open the first doorway 14, in the second direction R2 along the inner circumference of the frame structure 12 into the third position (see FIG. 5), in which the segments 32, 34 open the third doorway 18.

After a person has entered the lock chamber 44 from one of the areas 104, 106, 108 through the second, the third or the fourth doorway 16, 18, 20, the control device 43 of the security door 10 provides for the lock chamber 44 to be sealed off completely before the first doorway 14 is opened. In particular, the control device 43 controls the movement of the segments 32, 34 of the lock element 30 relative to the frame structure 12 in such a way that, starting from the first position according to FIG. 1, in which the segments 32, 34 open the fourth doorway 20, the second position according to FIG. 4, in which the segments 32, 34 open the second doorway 16, and/or the third position according to FIG. 5, in which segments 32, 34 open the third doorway 18, the segments 32, 34 are moved relative to the frame structure 12 along the inner circumference of the frame structure 12 into a fifth position shown in FIG. 7, in which the segments 32, 34 close all the doorways 14, 16, 18, 20 constructed in the lateral surface of the frame structure 12. Only then is the movement of the segments 32, 34 of the lock element 30 relative to the frame structure 12 controlled by the control device 43 in such a way that the segments 32, 34 are then moved from the fifth position according to FIG. 7 along the inner circumference of the frame structure 12 into the fourth position (see FIG. 6) in which the segments 32, 34 open the first doorway 14. The control device 43 controls the movement of the segments 32, 34 of the lock element 30 relative to the frame structure 12 starting from the fifth position according to FIG. 7, in which the segments 32, 34 close all the doorways 14, 16, 18, 20 constructed in the lateral surface of the frame structure 12, according to a suitable opening signal, which is issued for example as a reaction to inputting an access code at the control device 43.

The movement of the segments 32, 34 of the lock element 30 relative to the frame structure 12 is controlled by the control device 43 in such a way that, starting from the first position according to FIG. 1, in which the segments 32, 34 open the fourth doorway 20, the second segment 34 is moved relative to the frame structure 12 and the first segment 32 in the second direction R2 along the inner circumference of the frame structure 12 into the fifth position according to FIG. 7, in which the segments 32, 34 close all the doorways 14, 16, 18, 20 constructed in the lateral surface of the frame structure 12. The segments 32, 34 can then be moved together, i.e. at the same time and in the same direction, relative to the frame structure 12 from the fifth position according to FIG. 7 in the first direction R1 along the inner circumference of the frame structure 12 into the fourth position according to FIG. 6, in which the segments 32, 34 open the first doorway 14.

In similar manner, the movement of the segments 32, 34 of the lock element 30 relative to the frame structure 12 can be controlled by the control device 43 in such a way that, starting from the second position according to FIG. 4, in which the segments 32, 34 open the second doorway 16, the first segment 32 is moved relative to the frame structure 12 and the second segment 34 in the first direction R1 along the inner circumference of the frame structure 12 into the fifth position according to FIG. 7, in which the segments 32, 34 close all the doorways 14, 16, 18, 20 constructed in the lateral surface of the frame structure 12. The segments 32, 34 can then be moved together relative to the frame structure 12 from the fifth position according to FIG. 7 in the first direction R1 along the inner circumference of the frame structure 12 into the fourth position according to FIG. 6, in which the segments 32, 34 open the first doorway 14.

Figure 5:
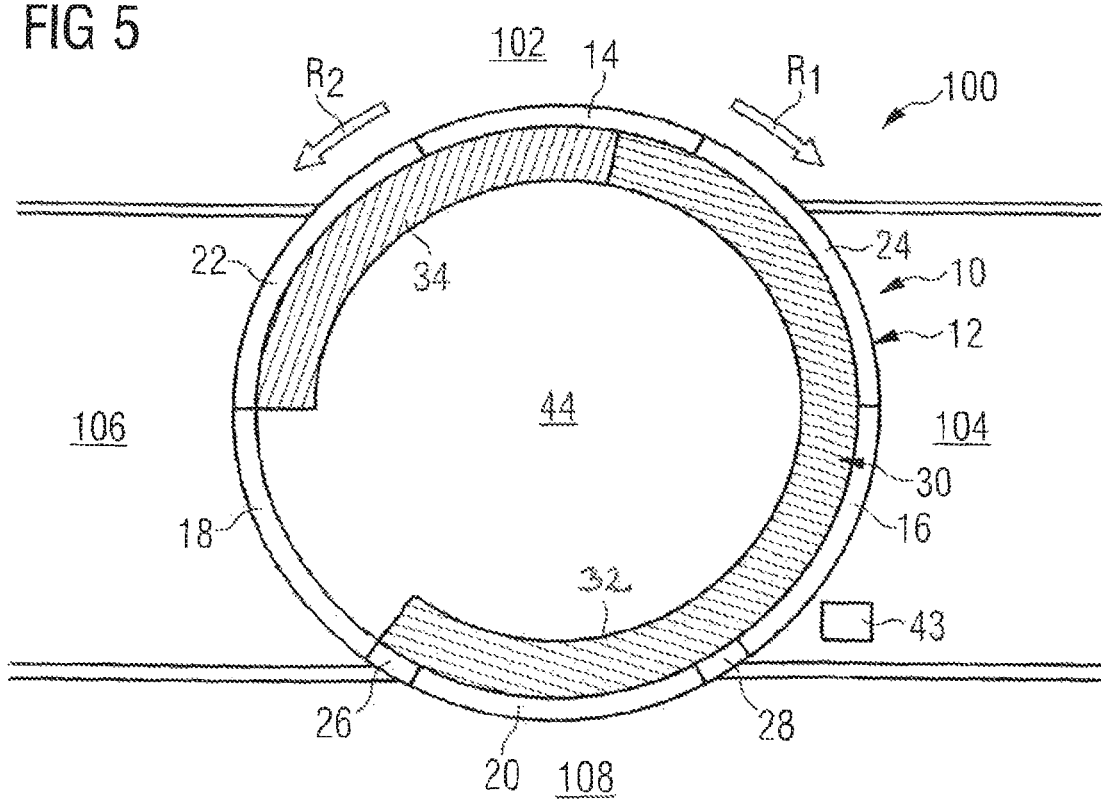

Starting from the third position according to FIG. 5, in which the segments 32, 34 open the third doorway 18, the movement of the segments 32, 34 of the lock element 30 relative to the frame structure 12 is likewise controlled by the control device 43 in such a way that the first segment 32 is moved relative to the frame structure 12 and the second segment 34 in the first direction R1 along the inner circumference of the frame structure 12 into a position (not shown in the Figures) in which the first segment 32 adjoins the second segment 34 in the region of an edge of the third doorway 18 which faces the first doorway 14 and the segments 32, 34 close all the doorways 14, 16, 18, 20 constructed in the lateral surface of the frame structure 12. The segments 32, 34 can then be moved together relative to the frame structure 12 in the second direction R2 along the inner circumference of the frame structure 12 into the fourth position according to FIG. 6, in which the segments 32, 34 open the first doorway 14.

In an embodiment of the security door 10 which is shown in FIGS. 8 to 14, the first segment 32 of the lock element 30 comprises a first segment portion 32a, which is movable along the inner circumference of the frame structure 12 relative to the frame structure 12, and a second segment portion 32b, which is movable independently of the first segment portion 32a along the inner circumference of the frame structure 12 relative to the frame structure 12. The first segment portion 32a of the first segment 32 is dimensioned so that, when positioned accordingly relative to the frame structure 12, it can close any doorway 14, 16, 18, 20. If the segments 32, 34 of the lock element 30 are located in their first position shown in FIG. 8, in which they open the fourth doorway 20, the first segment portion 32a of the first segment 32 extends along the inner circumference of the frame structure 12 over the first doorway 14 and adjoins the second segment 34 in the second direction R2 along the inner circumference of the frame structure 12.

Figure 8:
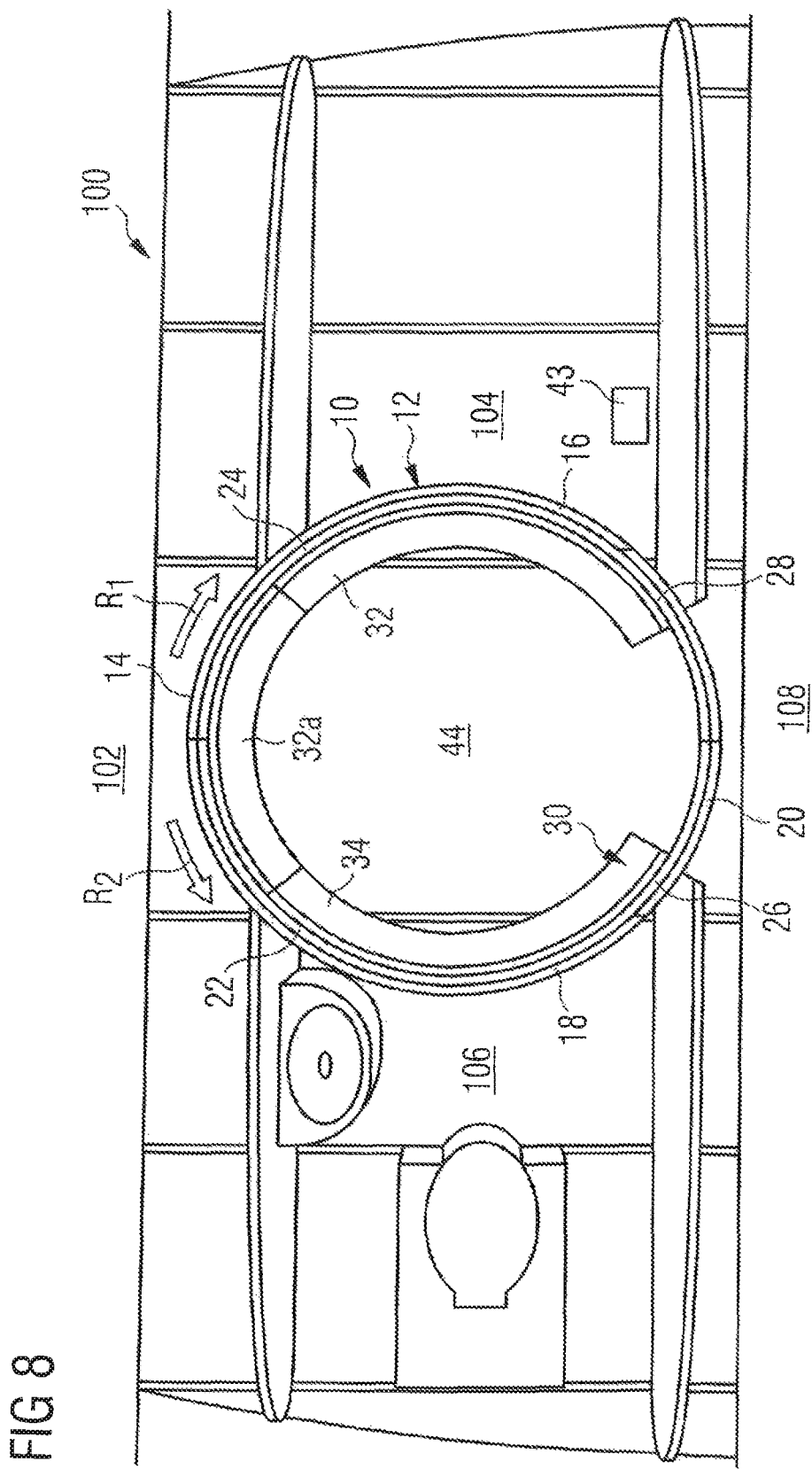
Figure 9:
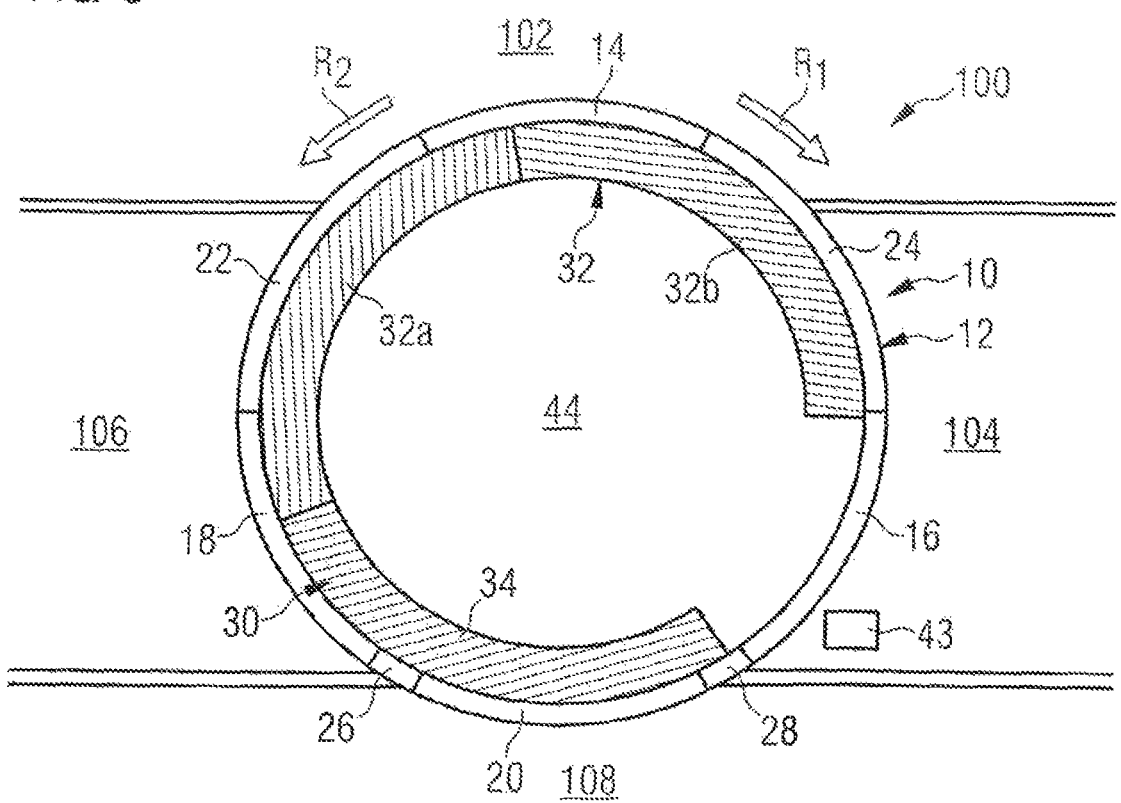

As explained above in connection with a lock element 30 with a single-piece first segment 32, the movement of the segments 32, 34 relative to the frame structure 12 in the case of a lock element 30 with a two-piece first segment 32 is also controlled by the control device 43 in such a way that the segments 32, 34, and therefore also the segment portions 32a, 32b of the first segment 32, are moved together relative to the frame structure 12 from a first position according to FIG. 8, in which the segments 32, 34 open the fourth doorway 20, in the second direction R2 along the inner circumference of the frame structure 12 into a second position shown in FIG. 9, in which the segments 32, 34 open the second doorway 16. The movement of the segments 32, 34 of the lock element 30 relative to the frame structure 12 is further controlled in such a way that the segments 32, 34 and therefore also the segment portions 32a, 32b of the first segment 30 are moved together relative to the frame structure 12 from the first position according to FIG. 8, in which the segments 32, 34 open the fourth doorway 20, in the first direction R1 along the inner circumference of the frame structure 12 into a third position shown in FIG. 10, in which the segments 32, 34 open the third doorway 18.

Figure 10:
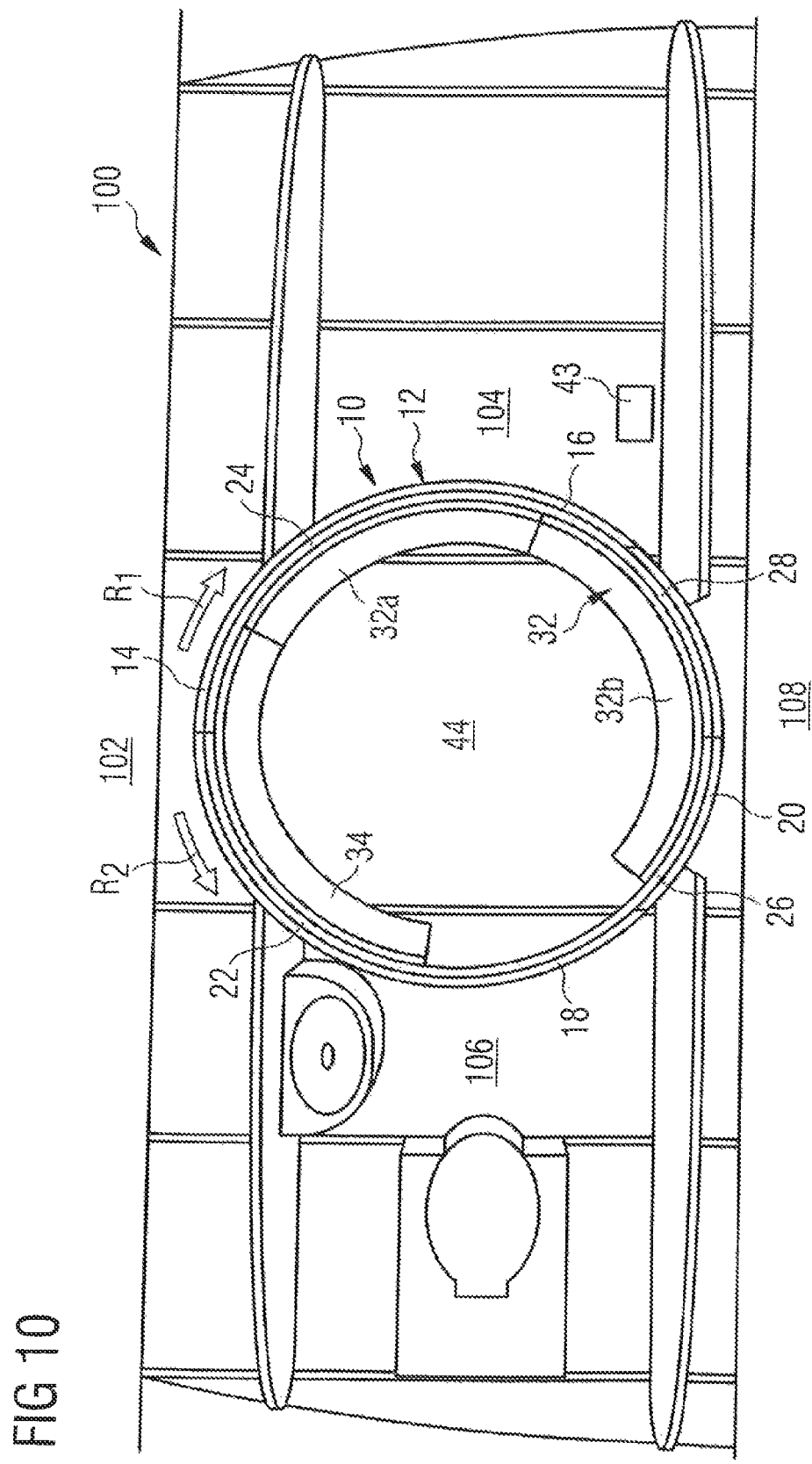
Figure 11:
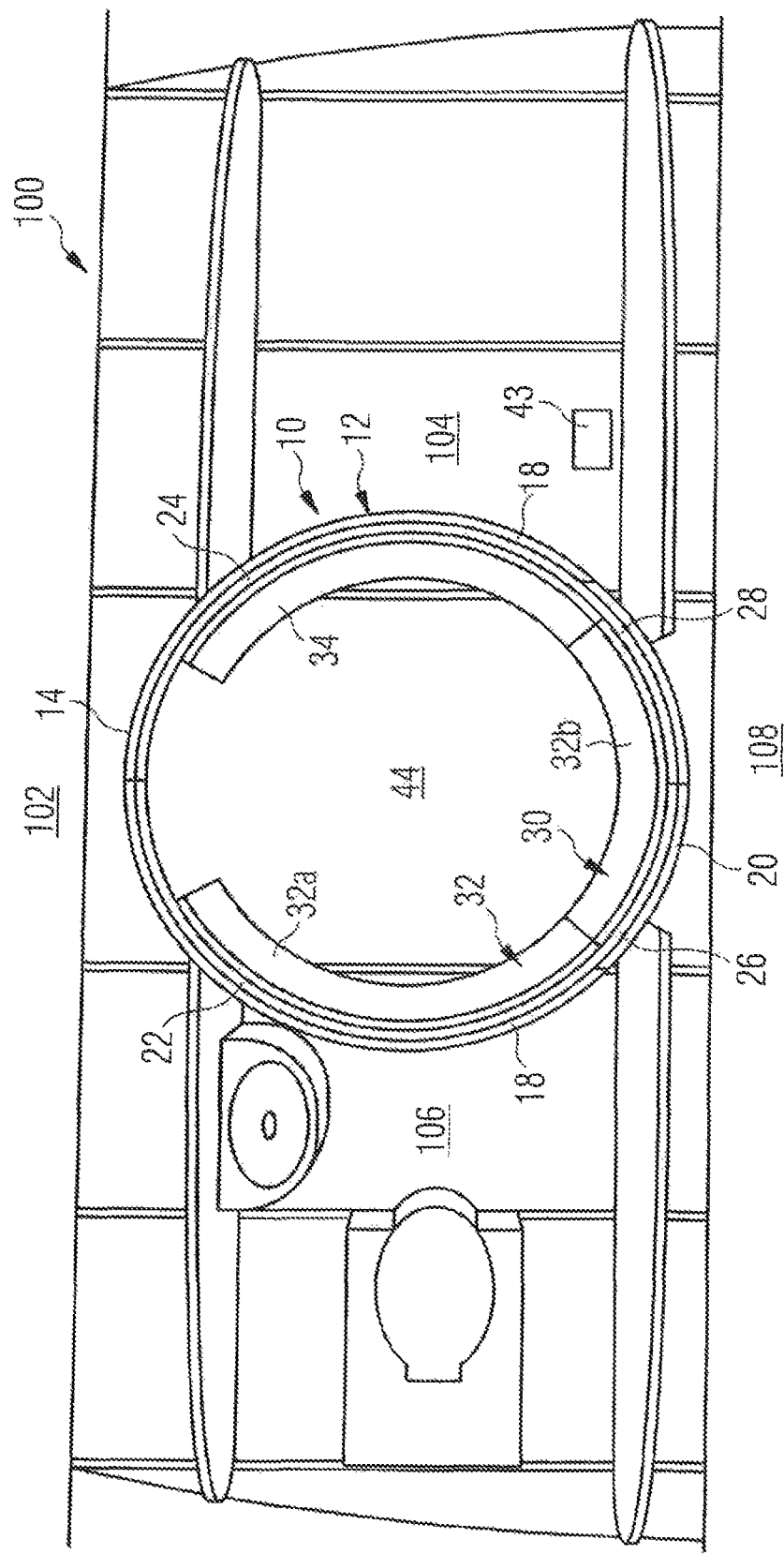

The movement of the segments 32, 34 of the lock element 30 relative to the frame structure 12 is further controlled by the control device 43 in such a way that the segments 32, 34 and therefore also the segment portions 32a, 32b of the first segment 32 are moved together relative to the frame structure 12 from a fourth position, shown in FIG. 11, in which the segments 32, 34 open the first doorway 14, in the first direction R1 along the inner circumference of the frame structure 12 into the second position according to FIG. 9, in which the segments 32, 34 open the second doorway 16. The movement of the segments 32, 34 of the lock element 30 relative to the frame structure 12 is finally controlled in such a way that the segments 32, 34 and therefore also the segment portions 32a, 32b of the first segment 32 are moved together relative to the frame structure 12 from a fourth position according to FIG. 11, in which the segments 32, 34 open the first doorway 14, in the second direction R2 along the inner circumference of the frame structure 12 into the third position according to FIG. 10, in which the segments 32, 34 open the third doorway 18.

Figure 12:
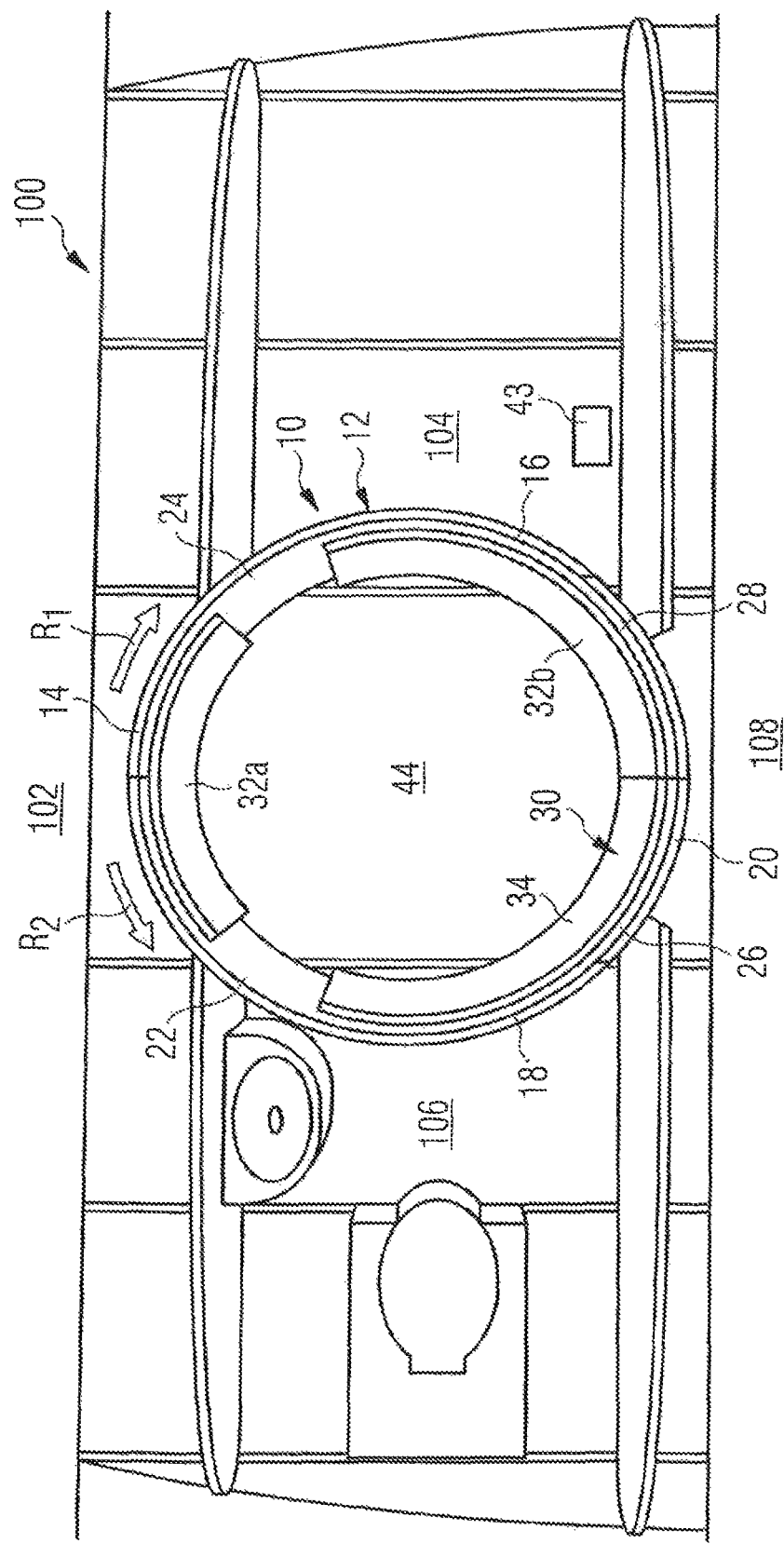

The control device 43 moreover controls the movement of the segments 32, 34 of the lock element 30 and the segment portions 32a, 32b of the first segment 32 relative to the frame structure 12 in such a way that, starting from the first position according to FIG. 8, in which the segments 32, 34 open the fourth doorway 20, the segments 32, 34 are moved relative to the frame structure 12 along the inner circumference of the frame structure 12 into a sixth position shown in FIG. 12, in which the segments 32, 34 close all the doorways 14, 16, 18, 20 constructed in the lateral surface of the frame structure 12. The control device 43 then controls the movement of the segments 32, 34 in such a way that the segments 32, 34 are moved from the sixth position according to FIG. 12 along the inner circumference of the frame structure 12 into the fourth position according to FIG. 11, in which the segments 32, 34 open the first doorway 14. After a person has entered the lock chamber 44 from one of the areas 104, 106, 108 through the second, the third or the fourth doorway 16, 18, 20, then the control device 43 of the security door 10 again provides for the lock chamber 44 to be sealed off completely before the first doorway 14 is opened.

The movement of the first and the second segment 32a, 32b of the lock element 32 relative to the frame structure 12 is controlled by the control device 43 in such a way that, starting from the first position according to FIG. 8, in which the segments 32, 34 open the fourth doorway 20, the second segment 34 is moved relative to the frame structure 12 and the first segment portion 32a of the first segment 32 in the second direction R2 along the inner circumference of the frame structure 12. The control device 43 further controls a movement of the second segment portion 32b of the first segment 32 relative to the frame structure 12 and the first segment portion 32a of the first segment 32 in the first direction R1 along the inner circumference of the frame structure 12 into the sixth position according to FIG. 12, in which the segments 32, 34 close all the doorways 14, 16, 18, 20 constructed in the lateral surface of the frame structure 12. In other words, the first segment portion 32a of the first segment 32 remains in its position, while the second segment portion 32b of the first segment 32 and the second segment 34 move in opposite directions along the inner circumference of the frame structure 12 until all the doorways 14, 16, 18, 20 constructed in the lateral surface of the frame structure 12 are closed.

Starting from the second position according to FIG. 9, in which the segments 32, 34 open the second doorway 16, or the third position according to FIG. 10, in which the segments 32, 34 open the third doorway 18, the movement of the segments 32, 34 as explained above in connection with a security door 10 having a single-piece first segment 32, can be controlled to move the segments into the fifth position shown in FIG. 7, in which the segments 32, 34 close all the doorways 14, 16, 18, 20 constructed in the lateral surface of the frame structure 12.

Figure 13:
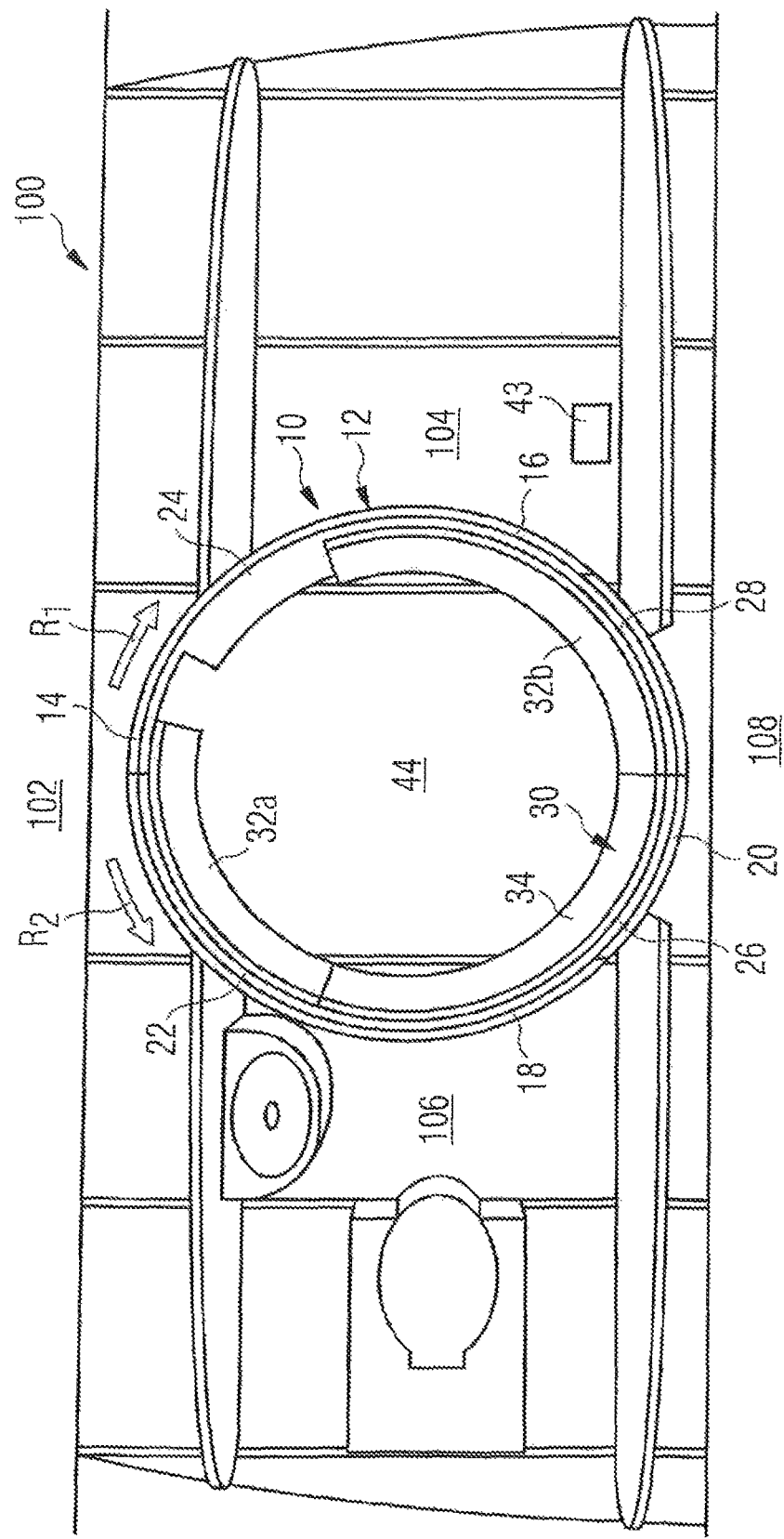

In order to open the first doorway 14, starting from the sixth position according to FIG. 12, in which the segments 32, 34 close all the doorways 14, 16, 18, 20 constructed in the lateral surface of the frame structure 12, the control device 43 controls a movement of the first segment portion 32a of the first segment 32 relative to the frame structure 12, the second segment 34 and the second segment portion 32b of the first segment 32 in the second direction R2 along the inner circumference of the frame structure 12 into an intermediate position according to FIG. 13, in which the first segment portion 32a of the first segment 32 adjoins the second segment 34. The segments 32, 34 are then moved together relative to the frame structure 12 from the intermediate position according to FIG. 13 in the second direction R2 along the inner circumference of the frame structure 12 into the fourth position according to FIG. 11, in which the segments 32, 34 open the first doorway 14.

Figure 14:
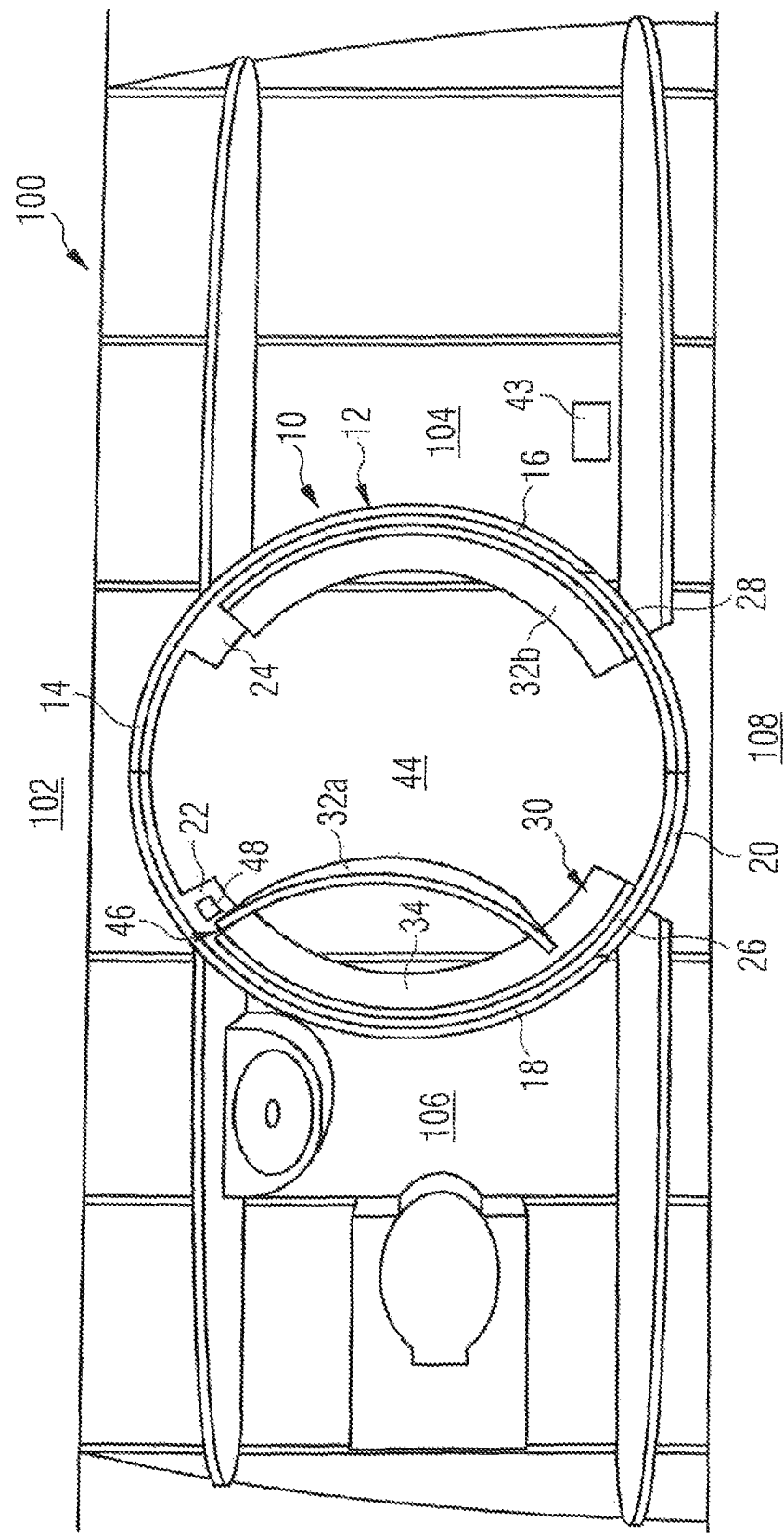

As can be seen in FIG. 14, the security door 10 further comprises a swivel arrangement 46 which enables a swivel movement of the first segment portion 32a of the first segment 32 relative to the frame structure 12 and the second segment portion 32b of the first segment 32 in the direction of the lock area 44 of the security door 10. If the segments 32, 34 of the lock element 30 open the fourth doorway 20, the first doorway 14 can be opened at the same time by swivelling the first segment portion 32a of the first segment 32 relative to the frame structure 12 and the second segment portion 32b of the first segment 32 in the direction of the lock area 44 of the security door 10. This constellation is not usually desirable in normal operation of the security door but, in an emergency situation, for example in the event of a fire in the first area 102 adjoining the first doorway 14, it enables two fire fighters carrying an extinguishing hose to gain access to the first area 102.

To counteract misuse of the swivel arrangement 46, the security door 10 further comprises a locking mechanism 48 (merely indicated schematically in FIG. 14) which, in an unlocking position, enables a swivel movement of the first segment portion 32a of the first segment 32 relative to the frame structure 12 in the direction of the lock area 44 and, in a locking position, prevents a swivel movement of the first segment portion 32a of the first segment 32 relative to the frame structure 12 in the direction of the lock area 44. The locking mechanism 48 is controlled electronically and only assumes its unlocking position upon a corresponding signal which indicates that the aircraft is on the ground and an emergency situation has arisen in the first area 102.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A security door comprising:
   a frame structure having a lateral surface in which a plurality of doorways is constructed, wherein a first doorway constructed in the lateral surface of the frame structure has a first width along an inner circumference of the frame structure, and wherein lateral surface portions delimiting the first doorway in a first direction and in a second direction along the inner circumference of the frame structure have a second width, wherein the second direction opposes the first direction, and
   a lock element received in the frame structure,
   the lock element comprising a first segment, which is movable along the inner circumference of the frame structure relative to the frame structure, and a second segment, wherein said second segment is movable independently of the first segment along the inner circumference of the frame structure relative to the frame structure, and wherein said second segment is movable to a position in which an end surface of the second segment directly contacts an end surface of the first segment,
wherein the first segment of the lock element is dimensioned so that, in a position in which the first segment closes the first doorway, the first segment also closes a second doorway adjacent to the first doorway in the first direction along the inner circumference of the frame structure.

2. The security door according to claim 1, wherein the second segment of the lock element is dimensioned so that, in a position in which the second segment in the second direction along the inner circumference of the frame structure adjoins the first segment closing the first doorway, the second segment closes a third doorway adjacent to the first doorway in the second direction along the inner circumference of the frame structure.

3. The security door according to claim 1, wherein a fourth doorway opposite the first doorway is constructed in the lateral surface of the frame structure, wherein a third width of the fourth doorway along the inner circumference of the frame structure equals the first width of the first doorway, and wherein lateral surface portions delimiting the fourth doorway in the first direction and the second direction along the inner circumference of the frame structure have a fourth width which is smaller than the third width of the fourth doorway.

4. The security door according to claim 1, further comprising a control device which is adapted to control the movement of the segments of the lock element relative to the frame structure independently of one another according to predetermined control regulations for access to areas adjoining the security door.

5. The security door according to claim 4, wherein the control device is adapted to control the movement of the segments of the lock element relative to the frame structure, wherein the movement includes at least one of:
moving the segments together relative to the frame structure from a first position, in which the segments open a fourth doorway that is positioned opposite the first doorway and that is constructed in the lateral surface of the frame structure, in the second direction along the inner circumference of the frame structure into a second position, in which the segments open the second doorway, and
moving the segments together relative to the frame structure, from the first position, in which the segments open the fourth doorway, in the first direction along the inner circumference of the frame structure into a third position, in which the segments open a third doorway.

6. The security door according to claim 4, wherein the control device is adapted to control the movement of the segments of the lock element relative to the frame structure, wherein the movement includes at least one of:
moving the segments together relative to the frame structure from a fourth position, in which the segments open the first doorway, in the first direction along the inner circumference of the frame structure to a second position, in which the segments open the second doorway, and
moving the segments together relative to the frame structure from the fourth position, in which the segments open the first doorway, in the second direction along the inner circumference of the frame structure to a third position, in which the segments open a third doorway.

7. The security door according to claim 4, wherein the control device is adapted to control the movement of the segments of the lock element relative to the frame structure such that the segments are moved relative to the frame structure along the inner circumference of the frame structure starting from at least one of a first position in which the segments open a fourth doorway, a second position in which the segments open the second doorway, and a third position in which the segments open a third doorway to a fifth position, in which the segments close all the doorways constructed in the lateral surface of the frame structure, and such that the segments are then moved from the fifth position along the inner circumference of the frame structure to a fourth position, in which the segments open the first doorway.

8. The security door according to claim 4, wherein the control device is adapted to control the movement of the segments of the lock element relative to the frame structure, wherein the movement includes:
starting from a first position, in which the segments open a fourth doorway, moving the second segment relative to the frame structure and the first segment in the second direction along the inner circumference of the frame structure to a fifth position, in which the segments close all the doorways constructed in the lateral surface of the frame structure, and
then moving the segments together relative to the frame structure from the fifth position in the first direction along the inner circumference of the frame structure to a fourth position, in which the segments open the first doorway.

9. The security door according to claim 1, wherein the first segment of the lock element comprises a first segment portion, which is movable along the inner circumference of the frame structure relative to the frame structure, and a second segment portion, which is movable independently of the first segment portion along the inner circumference of the frame structure relative to the frame structure, wherein the first segment portion of the first segment is dimensioned such that, when the segments are in a first position in which the segments open a fourth doorway, the first segment portion closes the first doorway.

10. The security door according to claim 9, wherein a control device is adapted to control the movement of the segments of the lock element and the segment portions of the first segment relative to the frame structure such that the segments are moved, starting from the first position in which the segments open the fourth doorway, relative to the frame structure along the inner circumference of the frame structure to a sixth position, in which the segments close all the doorways constructed in the lateral surface of the frame structure, and such that the segments are then moved from the sixth position along the inner circumference of the frame structure to a fourth position, in which the segments open the first doorway.

11. The security door according to claim 9, wherein a control device is adapted to control the movement of the first and the second segment of the lock element relative to the frame structure, wherein the movement includes:
starting from the first position in which the segments open the fourth doorway, moving the second segment relative to the frame structure and relative to the first segment portion of the first segment in the second direction along the inner circumference of the frame structure, and moving the second segment portion of the first segment relative to the frame structure and relative to the first segment portion of the first segment in the first direction along the inner circumference of the frame structure to a sixth position in which the segments close all the doorways constructed in the lateral surface of the frame structure, then moving the first segment portion of the first segment relative to the frame structure, relative to the second segment and relative to the second segment portion of the first segment in the second direction along the inner circumference of the frame structure to an intermediate position in which the first segment portion of the first segment adjoins the second segment, and then moving the segments together relative to the frame structure from the intermediate position in the second direction along the inner circumference of the frame structure to a fourth position, in which the segments open the first doorway.

12. The security door according to claim 9, including a swivel arrangement that is arranged to enable a swivel movement of the first segment portion of the first segment relative to the frame structure and the second segment portion of the first segment relative to the frame structure in a direction of an internal area of the frame structure.

13. The security door according to claim 12, including a locking mechanism which is configured such that, in an unlocking position, the locking mechanism permits the swivel movement of the first segment portion of the first segment relative to the frame structure in the direction of the internal area of the frame structure and, in a locking position, the locking mechanism prevents the swivel movement of the first segment portion of the first segment relative to the frame structure in the direction of the internal area of the frame structure.

14. The security door according to claim 1, wherein mutually adjacent edge regions of the segments are provided with complementary cutouts to enable the edge regions to overlap along the inner circumference of the frame structure.

15. A security area, comprising:
the security door according to claim 1, and
a plurality of areas adjoining the security door, which are connected to one another by the security door.

16. The security door according to claim 9, wherein mutually adjacent edge regions of the segment portions are provided with complementary cutouts to enable the edge regions to overlap along the inner circumference of the frame structure.

* * * * *